(12) United States Patent
Marron et al.

(10) Patent No.: US 11,874,378 B2
(45) Date of Patent: *Jan. 16, 2024

(54) SYSTEM FOR COHERENT IMAGING IN DYNAMIC ENGAGEMENTS

(71) Applicant: Raytheon Company, Waltham, MA (US)

(72) Inventors: Joseph Marron, Manhattan Beach, CA (US); Maurice J. Halmos, Encino, CA (US); Justin S. Grayer, Marina Del Rey, CA (US); David N. Sitter, Jr., Torrance, CA (US); Gamze Erten, Agoura Hills, CA (US)

(73) Assignee: Raytheon Company, Tewksbury, MA (US)

( * ) Notice: Subject to any disclaimer, the term of this patent is extended or adjusted under 35 U.S.C. 154(b) by 350 days.

This patent is subject to a terminal disclaimer.

(21) Appl. No.: 17/232,863

(22) Filed: Apr. 16, 2021

(65) Prior Publication Data
US 2021/0255325 A1 Aug. 19, 2021

Related U.S. Application Data

(63) Continuation of application No. 14/988,476, filed on Jan. 5, 2016, now Pat. No. 10,996,336.

(51) Int. Cl.
*G01S 17/89* (2020.01)
*G01S 17/58* (2006.01)
(Continued)

(52) U.S. Cl.
CPC ............ *G01S 17/89* (2013.01); *G01S 7/4812* (2013.01); *G01S 17/58* (2013.01); *F41H 13/005* (2013.01)

(58) Field of Classification Search
None
See application file for complete search history.

(56) References Cited

U.S. PATENT DOCUMENTS

| | | | |
|---|---|---|---|
| 4,913,547 A | * | 4/1990 | Moran ............... G01B 9/02067 73/656 |
| 5,780,838 A | | 7/1998 | Livingston et al. |

(Continued)

FOREIGN PATENT DOCUMENTS

| | | |
|---|---|---|
| CN | 102854511 A | 1/2013 |
| CN | 103038664 A | 4/2013 |

(Continued)

OTHER PUBLICATIONS

Siegman, "The Antenna Properties of Optical Heterodyne Receivers," Proceedings of the IEEE, vol. 54, No. 10, Oct. 1966, pp. 1350-1356.

(Continued)

*Primary Examiner* — Luke D Ratcliffe

(57) ABSTRACT

A coherent imaging system produces coherent flood illumination directed toward a remote object and local oscillator (LO) illumination derived based on a same master oscillator as the flood illumination. A Doppler sensor receives the LO illumination and a return of flood illumination reflected off the object. Doppler shift data from the Doppler sensor, corresponding to a longitudinal velocity of the object relative to the imaging system, is used to produce Doppler-shifted LO illumination received by a low bandwidth, large format focal plane array (FPA), together with the return illumination from the object. Interference between the Doppler-shifted LO illumination and the return illumination facilitates producing an image of the object with the low bandwidth FPA despite the longitudinal velocity. Pixel intensities from the FPA are integrated over a period approaching (Continued)

the maximum interference frequency. The Doppler sensor and FPA may concurrently process return for a high energy laser target spot.

20 Claims, 4 Drawing Sheets

(51) Int. Cl.
*G01S 7/481* (2006.01)
*F41H 13/00* (2006.01)

(56) References Cited

U.S. PATENT DOCUMENTS

| | | | |
|---|---|---|---|
| 5,780,839 | A | 7/1998 | Livingston |
| 5,900,620 | A | 5/1999 | Livingston |
| 6,115,123 | A * | 9/2000 | Stappaerts .............. G03H 1/08 356/121 |
| 6,343,766 | B1 | 2/2002 | Livingston |
| 7,342,651 | B1 | 3/2008 | Woolfson |
| 7,405,834 | B1 | 7/2008 | Marron et al. |
| 7,626,152 | B2 | 12/2009 | King et al. |
| 8,068,235 | B1 | 11/2011 | Marron et al. |
| 8,218,589 | B1 | 7/2012 | Saunders |
| 8,362,410 | B2 | 1/2013 | King et al. |
| 8,415,600 | B2 | 4/2013 | Hutchin |
| 8,748,857 | B2 | 6/2014 | King et al. |
| 8,755,036 | B2 | 6/2014 | Hutchin |
| 8,972,163 | B2 | 3/2015 | Green et al. |
| 9,438,871 | B2 | 9/2016 | Ide et al. |
| 10,401,499 | B2 * | 9/2019 | Marron .................. H04N 7/183 |
| 10,502,951 | B2 | 12/2019 | Sitter, Jr. et al. |
| 10,754,038 | B2 | 8/2020 | Marron et al. |
| 2002/0153497 | A1 | 10/2002 | Pepper et al. |
| 2011/0103410 | A1 | 5/2011 | Hutchin |
| 2012/0018614 | A1 | 1/2012 | King et al. |
| 2013/0188043 | A1 | 7/2013 | Decoster |

FOREIGN PATENT DOCUMENTS

| | | |
|---|---|---|
| CN | 103163530 A | 6/2013 |
| CN | 104034416 A | 9/2014 |
| CN | 104884995 A | 9/2015 |
| EP | 0899586 A2 | 3/1999 |
| EP | 2527780 A2 | 11/2012 |

OTHER PUBLICATIONS

Link et al., "Simulation and modeling of high energy laser systems", Proc. of SPIE, vol. 5414, Sep. 2004, pp. 26-40.
Forden, "The Airborne Laser", IEEE Spectrum, vol. 34, No. 9, Sep. 1997, pp. 40-49.
International Search Report and Written Opinion of the International Searching Authority dated May 19, 2017 in connection with International Patent Application No. PCT/US2017/019350.
Office Action dated Jul. 28, 2020 in connection with Korean Patent Application No. 10-2019-7037114, 7 pages.
Yan et al., Abstract, "Sub-regional wavefront hybrid algorithm for limited actuators deformable mirror", Optics Communications, vol. 426, Nov. 2018, 2 pages.
International Preliminary Report on Patentability dated Dec. 11, 2018 in connection with International Patent Application No. PCT/US2017/019350, 9 pages.
International Search Report dated Feb. 28, 2017 in connection with International Patent Application No. PCT/US2016/062624, 6 pages.
Written Opinion of the International Searching Authority dated Feb. 28, 2017 in connection with International Patent Application No. PCT/US2016/062624, 6 pages.
Communication Pursuant to Article 94(3) EPC dated May 10, 2021 in connection with European Patent Application No. 17713501.9, 9 pages.
Jian et al., "Error analysis of reference-beam laser Doppler velocimeter", High Power Laser and Particle Beams, vol. 22, Issue 11, Nov. 2010, 7 pages. (English Abstract only).
Office Action dated Oct. 9, 2021 in connection with Chinese Patent Application No. 201680083573.2, 14 pages.
Communication under Rule 71(3) EPC dated Mar. 16, 2023 in connection with European Patent Application No. 17713501.9, 48 pages.
Communication pursuant to Article 94(3) EPC dated Apr. 6, 2023 in connection with European Patent Application No. 17713501.9, 6 pages.

* cited by examiner

SYSTEM FOR COHERENT IMAGING IN DYNAMIC ENGAGEMENTS

CROSS-REFERENCE TO RELATED APPLICATION AND PRIORITY CLAIM

This application claims priority under 35 U.S.C. § 120 as a continuation of U.S. patent application Ser. No. 14/988,476 filed on Jan. 5, 2016 (now U.S. Pat. No. 10,996,336), which is hereby incorporated by reference in its entirety.

TECHNICAL FIELD

The present disclosure is directed in general to coherent imaging, and, more particularly, to coherent imaging in the context of relative movement between an imaged object and the sensor(s).

BACKGROUND OF THE DISCLOSURE

Coherent imaging methods have value for obtaining image-based information from distant objects. However, object motion on the order of the wavelength of light imparts interference features to the coherent signal.

SUMMARY OF THE DISCLOSURE

A coherent imaging system employs a flood illumination source to produce coherent flood illumination derived based on an output of a master oscillator (MO) and directed toward a remote object. A local oscillator (LO) illumination source produces LO illumination derived from an LO based on the MO. A Doppler sensor configured receives the LO illumination and at least part of return illumination of the coherent flood illumination reflected off the remote object. One or more processors employ the output of the Doppler sensor to generate Doppler shift data for a Doppler shift corresponding to a longitudinal velocity of the remote object relative to the coherent imaging system. A Doppler-shifted LO illumination source produces Doppler-shifted LO illumination based on the LO output and the Doppler shift data. A low bandwidth, large format focal plane array receives part of the return illumination and the Doppler-shifted LO illumination, measuring light intensity at each of an array of pixels. The processor(s) employ the light intensity data to generate an image of the remote object, based on interference of the Doppler-shifted LO illumination with the return illumination. For each pixel of the focal plane array, the light intensity information corresponding to the Doppler-shifted LO illumination superimposed with the return illumination is integrated over an appropriate period that may be selected based on the flood illumination pulse duration, where the integration period may range from 0.001 microseconds to 1 microsecond. The Doppler sensor may be a single pixel high-speed light sensor. When the coherent flood illumination is pulsed, the processor(s) may also use the Doppler sensor output to determine a range to the remote object. In some embodiments, a high energy laser (HEL) illumination source produces coherent target spot illumination directed toward the remote object. An HEL LO produces HEL LO illumination based on one or both of the LO or MO outputs. The focal plane array receives HEL return illumination of the coherent target spot illumination reflected off the remote object, together with the HEL LO illumination, such that the light intensity information for at least some pixels of the focal plane array corresponds to interference of the HEL LO illumination with the HEL return illumination. A mirror receives the coherent target spot illumination from the HEL illumination source and directs that coherent target spot illumination toward the remote target. The processors employ at least one of the output of the Doppler sensor or the light intensity data from the focal plane array to control one or both of deformation and orientation of the mirror. The mirror is controlled by the processor(s) in response to either a determined wavefront error (WFE), pre-distorting the coherent target spot illumination, or an alteration required for the direction of the coherent target spot illumination to coincide with an aimspot on the remote object.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
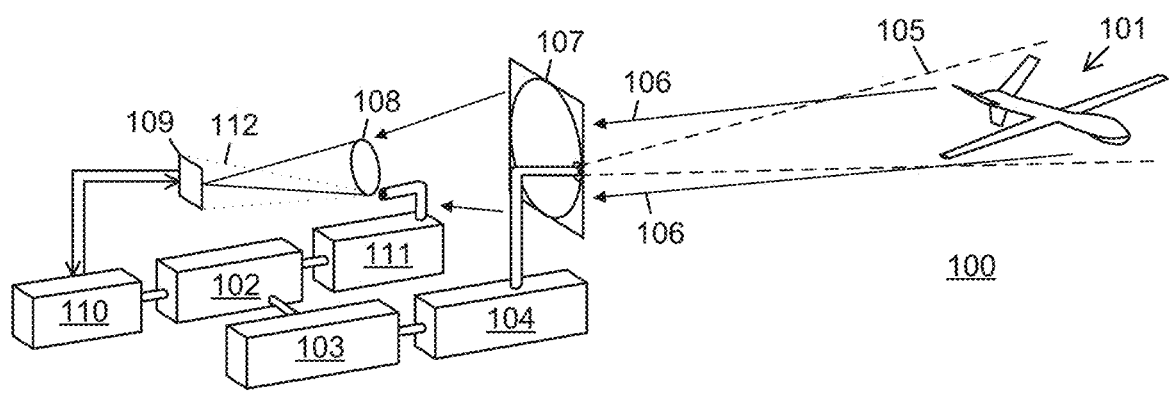
FIG. 1 is a diagram illustrating operation of a coherent imaging system in accordance with one embodiment of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Coherent imaging systems, where an active laser-based system is employed to measure the amplitude and phase of an image, rely on the interference between a local oscillator (LO) beam and the return from a coherently illuminated target. Coherent imaging provides great value for interrogating distant objects. Specific elements of this value include: improved performance with low light levels, three-dimensional (3D) imaging, correction of optical aberrations, and evaluation of intra-object motion. For example, coherent imaging generally involves photon-limited detection, which allows operation with lower illumination power than direct detection methods. In addition, three dimensional (3D) images may be obtained by combining coherent images at different wavelengths, and optical aberrations (e.g., wavefront errors) may be determined and corrected with coherent imaging.

Coherent signatures, however, are very dynamic and require high-speed data collection sensors to record image data. When the target moves relative to the sensor, the interference frequency (IF, which may be determined for the purposes discussed below based on the absolute value of the return illumination frequency minus the frequency of the frequency-shifted local oscillator) of the return experiences a Doppler shift. For dynamic engagements, this interference frequency can be variable, as the relative motion of the sensor and/or target change. Target motion on the order of the wavelength of light imparts interference features to the coherent signal, and thus prior coherent imaging systems must have very short integration times and high-bandwidths. Thus, while valuable in at least the respects described above, coherent imaging requires very high-speed detectors, because object motion on the order of the wavelength of light imparts essential information to the signal that must be recorded by the detection system. This complicates coherent imaging for engagements in which there is significant relative motion between the sensor platform and the object being interrogated. The present disclosure presents techniques allowing one to record coherent images in dynamic environments with significant relative motion between the sensor and object.

Prior attempts to address the problem resulting from relative motion between sensor and object have included the development of sensors with higher-speed recording capability (e.g., faster frame rates). In addition, some proposals have imparted an offset frequency to the reference beam (local oscillator or "LO") to compensate for longitudinal motion. The present disclosure concerns a coherent imaging system with a separate sensor that adaptively measures the required reference offset frequency and imparts this offset frequency to the reference beam, thereby allowing coherent imaging in dynamic engagements. The present disclosure employs a single or multiple pixel high-speed detector that can record the Doppler offset frequency from the object or a region of the target. The Doppler offset frequency is determined dynamically as the relative velocities of the sensor and object move and the determined Doppler frequency is imparted to the reference beam of the coherent imaging system, thereby allowing coherent imaging with a lower bandwidth, larger-format, imaging sensor. Various embodiments of the design described in the present disclosure include a coherent imaging system with one or more of (a) a high speed Doppler sensor, (b) dynamically imparting the Doppler offset frequency to the reference beam for dynamic engagements, and (c) a Doppler sensor having multiple pixels to improve performance and to evaluate the Doppler offset for different object regions.

FIG. 1 is a diagram illustrating operation of a coherent imaging system in accordance with one embodiment of the present disclosure. Those skilled in the art will recognize that, for simplicity and clarity, some features and components are not explicitly shown, including those illustrated in connection with later figures. For example, the entire optical system—that is, including all mirrors and lenses, beam splitters, transmitter/receivers, apertures, electromechanical shutters, etc., and the associated light paths—is not illustrated in FIG. 1. Such features, including those illustrated in later figures, will be understood to be equally applicable to the coherent imaging system of FIG. 1.

The coherent imaging system 100 excludes the target object 101 depicted in FIG. 1. A master oscillator 102 produces a frequency signal, which passes through modulator 103 and power amplifier 104 to drive an illumination source (a target illumination laser, not explicitly shown) directing coherent flood illumination 105 (illustrated with dashed lines having long dashes) toward the object 101 to be imaged. Light 106 (illustrated with solid lines ending in solid arrowheads) reflected off the object 101 is received through an exit pupil 107 and focused through an imaging pupil 108 onto a short wavelength infrared (SWIR) focal plane array (FPA) 109. SWIR FPA 109 operates under the control of a timing and control processor 110, which is coupled to the master oscillator 102. Also coupled to the master oscillator 102 is a local oscillator (LO) 111, which drives an illumination source (not explicitly shown) directing illumination 112 (illustrated with dashed lines having short dashes) onto the SWIR FPA 109.

In the system of FIG. 1, the target object 101 is flood illuminated with coherent light 105 at a frequency derived from master oscillator 102. The return (reflected) light 106 interferes with the illumination 112 based on the frequency of LO 111, which interference may be determined based on total light detected using FPA 109. This detection method may be referred to as spatial heterodyne or digital holography (DH). Such interference imaging enables photon-noise limited detection, phase processing that also allows 3D imaging, aberration determination/correction, and vibration imaging. However, the interference pattern must be static over the detection integration time—for example, about 100 nanoseconds (nsec) (that is, 0.1 microseconds (μsec)), or some other period within the range 0.001 μsec to 1.0 μsec. In addition, relative motion between the coherent imaging system and the object (especially longitudinal motion toward or away from each other) drives a need for either shorter detection intervals or offsetting the LO frequency in a manner canceling the Doppler frequency offset from the longitudinal object velocity.

Figure 2:
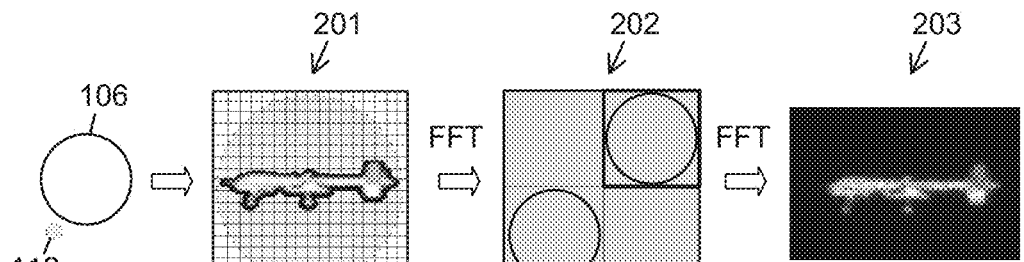
FIG. 2 illustrates image processing performed within the coherent imaging system of FIG. 1.

FIG. 2 illustrates processing performed within the coherent imaging system of FIG. 1. This processing 200 is performed by processing circuitry within, for example, the timing and control processor 110 or optionally by a separate processor coupled to the system 100 (and not shown in FIG. 1). The illumination 106 received through the exit pupil 107 and the illumination 112 based on the LO interfere at the detector array (i.e., the FPA), causing the intensity of light 201 received at the individual pixels of the detector array to vary based upon an image corresponding to flood illumination light reflected off the object. A fast Fourier transform (FFT) of the intensity values from the detector array produces digital image data 202 based on the light received through the exit pupil 107 and the LO-based illumination. A further FFT on a portion of the digital image data 202 may produce a digital display 203 of the intensity image, a complex-valued two-dimensional (2D) image for the object.

Figure 3:
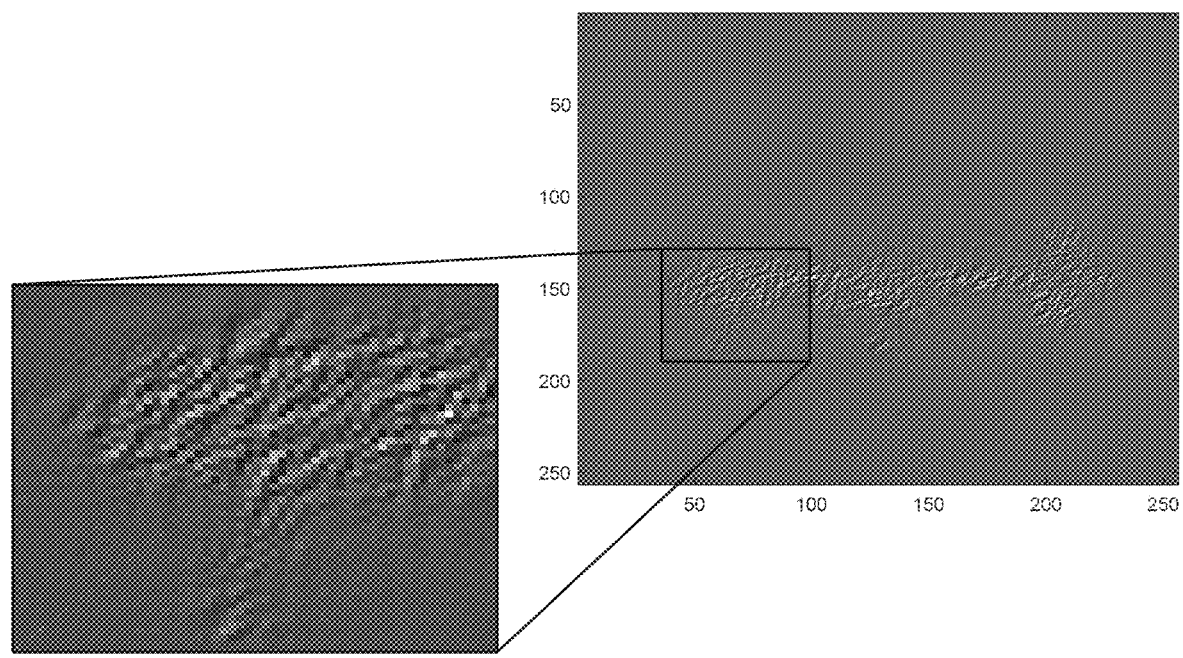
FIG. 3 is a simulated intensity image obtained using a coherent imaging system of the type illustrated in FIG. 1 together with the processing illustrated in FIG. 2.

FIG. 3 is a simulated intensity image obtained using a coherent imaging system of the type illustrated in FIG. 1 together with the processing illustrated in FIG. 2. The simulated intensity image corresponds to light recorded by a 256×256 detector array, illustrating how relative motion between the imaging sensor and the object can degrade the coherent signal and cause the fine fringe detail to "wash out." Note the blurred edges for fine fringe detail imparted by spatially offset LO. In dynamic engagements, longitudinal motion between the target and the imaging system (motion of the target toward or away from the imaging system) has the largest impact on fringe motion. The impact is sometimes referred to as a gross Doppler frequency shift. The effect occurs because integration time $T_{INT}$ (which must be less than the period of the interference frequency, i.e., $T_{INT} < 1/IF$) varies inversely with the longitudinal velocity, which in dynamic environments will often vary with time:

$$T_{INT} < \frac{\lambda}{V},$$

where $\lambda$ is the source wavelength and V is the longitudinal velocity. For large longitudinal velocities V, integration time can fall below the capability of the detector array technology. In some instances, the effect may be reduced by adding an offset frequency on the LO. Coherent imaging systems based on digital holography (DH) use a multi-pixel framing camera that records a "snapshot" of the interference pattern with an integration time $T_{INT}$ of, for example, 1 microsecond (μsec). This requires the interference pattern to be static over $T_{INT}$, which means that the IF must be less than 1 megaHertz (MHz). To accomplish DH detection in dynamic engagements thus requires the ability to monitor the target's Doppler shift and adjust the LO so that the IF is <1 MHz.

In the system for coherent imaging during dynamic engagements in accordance with the present disclosure, a high bandwidth coherent detection system is introduced to measure the Doppler shift in the return and thus the longitudinal velocity (i.e., a Doppler sensor). The Doppler offset frequency (proportional to the longitudinal velocity) is measured, and the measured Doppler frequency is applied to the shift the frequency of the LO beam to make the interference pattern static over the integration time. The capabilities of the high bandwidth detector employed may determine a limit on target range, for acceptable timing of SWIR FPA exposure. The Doppler sensor may consist of a single pixel detector, or alternatively may employ multiple pixels to enhance signal properties and determine Doppler shift for several points on the target. A high bandwidth detector also determines the target range for timing of SWIR focal plane array (FPA) exposure.

The coherent imaging system of the present disclosure employs a high-bandwidth detector (separate from the DH camera employed to measure interference) to measure the target's Doppler frequency. The Doppler frequency is then applied to the LO, so that the interference pattern is static over the camera's integration time. This process of Doppler measurement and IF adjustment is performed repetitively over the dynamic engagement, to enable DH based coherent imaging. The dedicated sensor for measuring Doppler shifts and resulting variation of the LO frequency provides an effective closed loop system in which changes in longitudinal velocity are compensated for in real time. This extends the utility of the coherent imaging system to highly dynamic environments.

Figure 4:
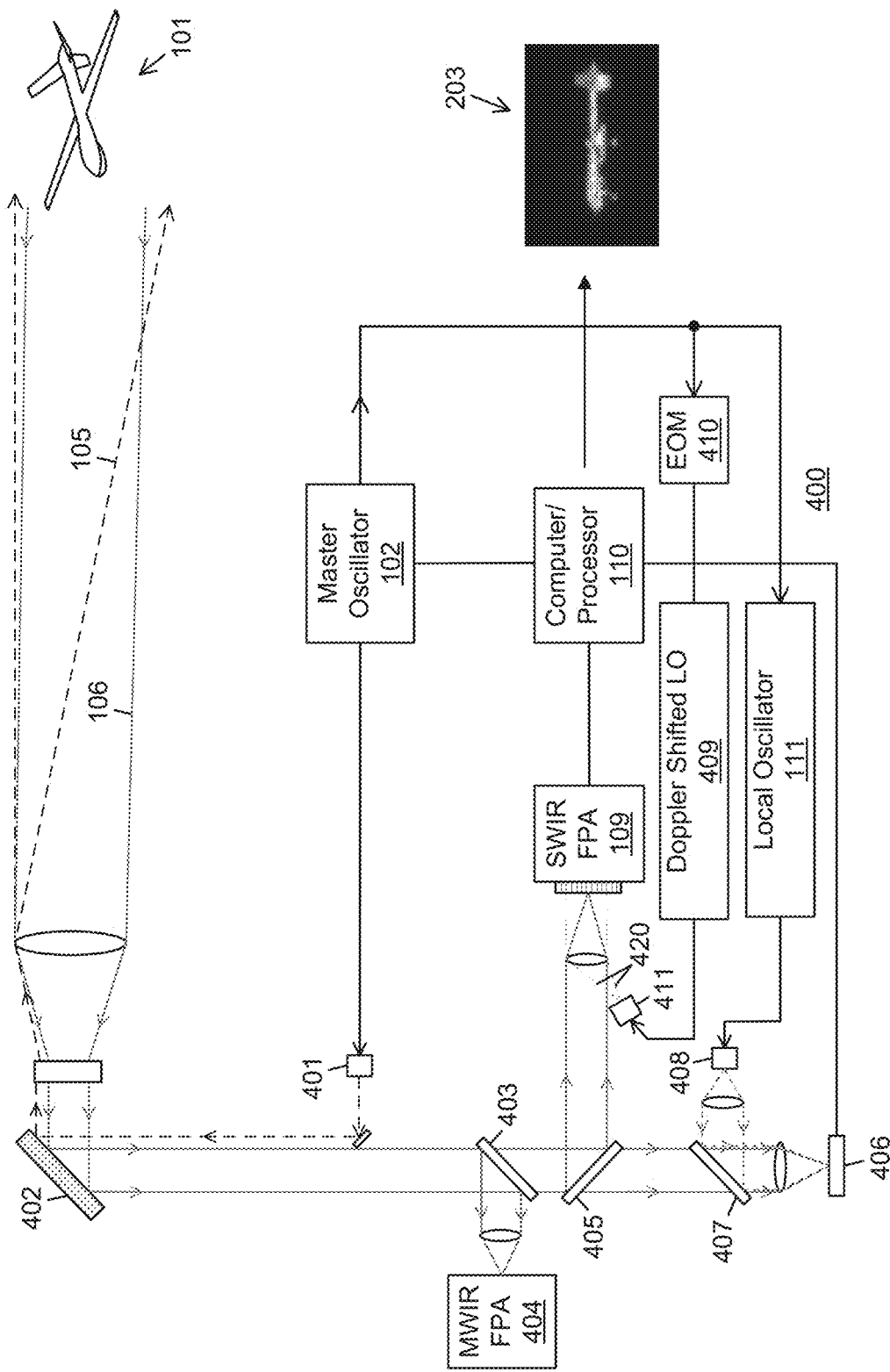
FIG. 4 is a diagrammatic illustration of additional details for the coherent imaging system of FIG. 1 in accordance with embodiments of the present disclosure.

FIG. 4 is a diagrammatic illustration of additional details for the coherent imaging system of FIG. 1, in accordance with embodiments of the present disclosure. For simplicity and clarity, some components of FIG. 1 and/or later figures are not shown, while additional components not illustrated in FIG. 1 are shown. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figures.

As previously described, coherent light 105 from flood illumination source 401 driven by master oscillator 102 reflects off object 101 and is received as reflected (or "return") illumination 106. In the embodiment shown, the coherent light from flood illumination source 401 reflects off a fixed mirror and then a (preferably deformable) mirror 402 before passing through suitable optical components for direction toward the object 101. A first beam splitter 403 splits the received return illumination 106, directing a portion to be focused on mid-wave infrared (MWIR) FPA 404. A second beam splitter 405 splits the portion of the return illumination 106 passing through the first beam splitter 403 between being focused on SWIR FPA 109 and being focused on a Doppler sensor 406. A transmitter/receiver 407, which may be polarized to pass through the part of the return illumination 106 not redirected by beam splitter 405, effectively superimposes the non-redirected portion of the return illumination 106 and illumination based on the LO frequency, from illumination source 408, on Doppler sensor 406. The Doppler sensor 406 has a single pixel (or a few pixels) that measure Doppler frequency of the return illumination relative to the LO illumination from illumination source 408. The sampling rate for the Doppler sensor 406 should be greater than the greatest (longitudinal) velocity for the target divided by the wavelength used for the flood illumination (or other illumination source(s) described below). The output of Doppler sensor 406 is received by a processor 110, which determines a Doppler shift (or offset) of the return illumination relative to the flood illumination. That Doppler shift is representative of the longitudinal velocity (or, stated differently, the longitudinal component of the total velocity) of the object 101 relative to the coherent imaging system 100.

The Doppler shift is measured and updated on a regular basis to account for longitudinal acceleration by object 101. The Doppler shift is employed by a Doppler-shifted local oscillator 409, which generates a Doppler-shifted version of the output frequency from the local oscillator 111 used to produce the Doppler-shifted LO illumination. A value based on a measurement (e.g., an inverse) of the Doppler shift may be applied to the frequency signal from the master oscillator 102 by an electro-optic modulator (EOM) 410. The output of EOM 410 is received by Doppler-shifted local oscillator 409, which produces a Doppler shifted LO illumination signal that drives an illumination source 411 to produce the Doppler shifted LO illumination 420. The image sensor SWIR FPA 109 is provided with the Doppler-shifted LO illumination 420 derived from Doppler shifted LO output signal, superimposed with a portion of the return illumination 106 from beam splitter 405, to offset Doppler effects on the imaging. As a result, the interference pattern can be recorded with a low bandwidth focal plane array—for example, an FPA operating with a 0.1 to 1 microsecond (μsec) global shutter.

As described above, the flood illumination from light source 401 and the LO illumination from light source 408 both derive from same stable master oscillator 102. Likewise, the Doppler-shifted local oscillator 409 derives from that same, stable master oscillator 102. For a pulsed system, the Doppler sensor 406 also measures the target range, so that the SWIR FPA 109 may be triggered when the return pulse from the object 101 is present.

The coherent imaging system 400 of the present disclosure also finds use in assessing a projected laser spot on a distant object. Determining the effectiveness of a focused high energy laser (HEL) spot on a remote target may be performed by indirect methods. In those applications, atmospheric aberrations may be sensed from the return of a separate beam, usually of a different wavelength, and correction imparted on the HEL beam. The HEL spot on target is usually not observable, since such (direct) observation requires superb boresight alignment, and line-of-sight (LOS) is typically the metric employed to determine a projected HEL spot location. Instead, the HEL spot on target is usually sensed using the MWIR FPA 404, which measures the HEL spot indirectly by sensing the thermal radiation. Furthermore, thermal sensing of the HEL spot is subject to latency, since the thermal effects are not instantaneous and the MWIR sensor 404 has lower imaging resolution than can be obtained at the native wavelength of the HEL source (typically near 1 micron). Passive imaging of the HEL spot at the native HEL wavelength for direct observation would therefore typically require an additional SWIR sensor. Because of those difficulties, target kill assessment is more commonly determined by a dramatic drop in signal-to-noise ratio (SNR).

As discussed above, coherent imaging methods have great value for obtaining image-based information from distant objects, including lower illumination power and determination of and correction for optical aberrations (wavefront errors). In addition, wavelength selectivity allows for simultaneous imaging of multiple bands. Accordingly, digital holography may be employed to simultaneously image and observe an HEL beam spot on a distant non-cooperative target.

Several configurations have been proposed to enhance target tracking using hit spot detection and assessment of hit spot effectiveness. Some require two detectors: one for the HEL spot detection and one for illumination return processing. The use of two detectors increases complexity and size, weight and power (SWaP) and requires filtering or active beam control to guide HEL return to imaging detector. Direct HEL spot detection methods are limited by detector noise (i.e., SNR limited). Registration issues inherent in using two separate detectors include strenuous boresight alignment and mechanical rigidity requirements, which increases system complexity, and will have an offset even when algorithms are used to compensate for registration, due to computational imprecisions. Target sizes are limited for previously proposed configurations since subpixel imaging pose a challenges for direct detect systems (that is, across subpixel target features, the HEL will be much smaller and harder to image). Wavefront error (WFE) measurements are performed by a separate detector (e.g., using Shack-Hartman, shearing interferometer, etc.), requiring the additional detector and processing. WFE measurements are indirect (e.g., based on WF gradient) and limited (in branch cuts, etc.) by effects that result from having a speckled return.

Directed energy weapons require adaptive optics to correct for wavefront aberrations imparted by the atmosphere during a mission scenario. However, once the wavefront is sensed and subsequently corrected for, direct assessment of the effectiveness of the correction at the target is difficult. Furthermore, kill assessment is often made by indirect means, e.g., target heating, which can lead to incorrectly identifying the target as neutralized. In the present disclosure, a real-time, high resolution hit spot detector monitors a laser beam spot projected onto a distant, non-cooperative target, and can also be used as a more direct means of damage assessment of a neutralized target. Digital holographic imaging is employed to simultaneously image both a distant target and a laser beam projected onto the distant target.

The present disclosure enables assessment of a projected laser spot on a distant object, including simultaneous coherent imaging of both a focused HEL spot and non-cooperative target at large distances. Spatially and angularly offset local oscillators interfere with the HEL and illumination return from the target. A coherent Doppler detector senses the Doppler shift frequency directly, and sends the signal to modulators which shift the frequency of the local oscillators to maintain coherence over the engagement timeline. The HEL hit spot on a distant target is therefore monitored directly, kill assessment is more easily determined, and the HEL can be "walked" onto an aim point. Use of a single detector minimizes SWaP, with acceptance of a single polarization return enabling a single transmitter/receiver (Tx/Rx) architecture HEL WFE may be sensed directly by examining the sharpness of the spot on the target and/or by sharpness maximization. Because of its limited extent the WFE can be determined with decreased processing and latency. The imaged HEL hitspot serves as a glint, which can be used to increase the system LOS accuracy.

Figure 5:
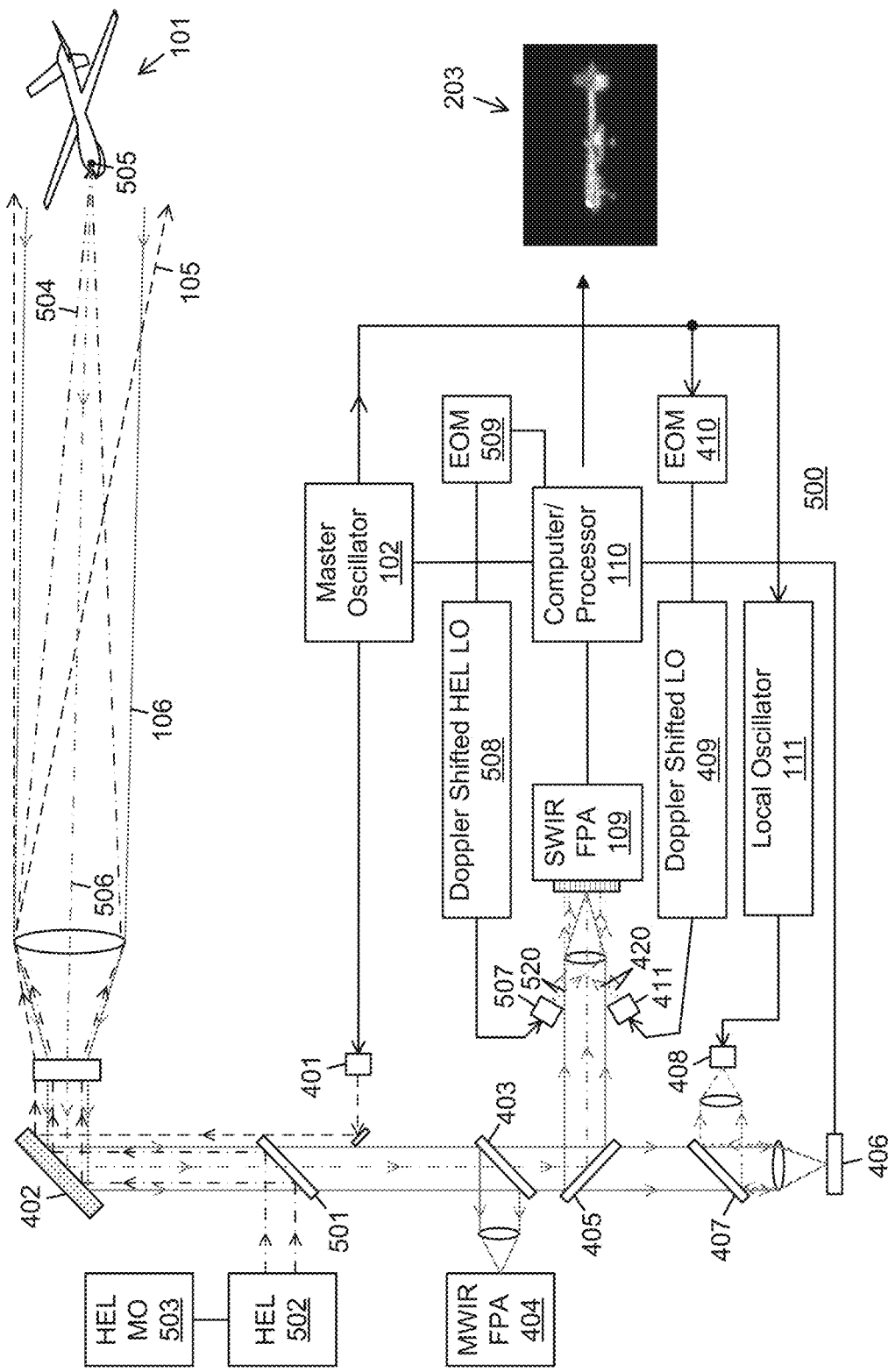
FIG. 5 is a diagrammatic illustration of additional details for the coherent imaging system of FIG. 1 in accordance with alternate embodiments of the present disclosure including a projected laser spot.

FIG. 5 is a diagrammatic illustration of additional details for the coherent imaging system of FIG. 1 in accordance with alternate embodiments of the present disclosure including a projected laser spot. The coherent imaging system 500 is similar to the embodiments of FIGS. 1 and 4, although some features (e.g., details of the optics system) that were not illustrated in FIGS. 1 and 4 are explicitly shown in FIG. 5. It will be understood that the same features may also be present in the embodiments of FIGS. 1 and 4. In addition, the complete light paths of outgoing and return light are not shown.

Coherent imaging system 500 includes a first transmitter/receiver 501 within the path of the return illumination 106. The transmitter/receiver 501 may have a polarization that may differ from the polarization of the transmitter/receiver 407, and may depend on the nature of the output illumination from the HEL 502. The HEL 502 produces high energy laser illumination 504 for projecting a laser spot 505 on the target 101. As discussed further below, HEL 502 may operate based on a signal from a master oscillator 503 separate from master oscillator 102. The transmitter/receiver 501 redirects the HEL illumination 504 to the mirror 402, which in turn redirects the HEL illumination 504 toward the target 101 to form a target spot 505 on the object 101. The return of reflected high energy laser illumination 506 reflected off target 101 follows a similar path as the return 106 of the flood illumination via mirror 402, through the transmitter/receiver 501, and redirected by beam splitter 405 to impinge upon onto SWIR FPA 109 HEL LO-modulated illumination 520 from illumination source 507, based on an output of Doppler-shifted HEL LO 508, is superimposed on the SWIR FPA 109 with the HEL return illumination 506. The Doppler-shifted HEL LO 508 may receive a signal from EOM 509 based on an output of Doppler sensor 406, and produce an output based on HEL MO 503. With such a configuration, the HEL LO illumination 520 from illumination source 507 is spatially, angularly, and spectrally offset from the LO illumination 420 from illumination source 411. The HEL LO illumination 520 is emitted onto the SWIR FPA 109, together with the return 106 of the flood illumination, the return of the HEL illumination 506, and the LO illumination 420. The gating or global shutter speed of gating of the SWIR FPA 109 may be set based upon the pulse timing for the flood illumination return. Because the HEL illumination 504 is typically continuous wave (CW) rather than pulsed, the system described offers flexibility in modifying the detector integration time for the HEL imaging. In addition, there may be orders of magnitude difference in the power levels of the HEL return 506 and the flood illumination return 106. To prevent saturation of the SWIR FPA 109 by the HEL return 506, various techniques including spectral and polarization attenuation may be employed, or the detector integration time may be adaptively decreased when the HEL return 506 is present. The combined illumination received at the SWIR FPA 109 is processed by processor 110 to indicate the image of the target 101 as well as the projected laser spot (if reflected off target 101)

The processor 110 determines WFE using an auto-focus algorithm, and the inverse of the WFE may be applied to mirror 402 under the control of the processor 110 to pre-distort the beam of the HEL illumination 504 and focus the HEL spot 505 onto target 101. In addition, the orientation of mirror 402 may also be altered under the control of the processor 110, together with or separately from alteration of the deformation, to change a direction in 3D space of the HEL illumination 504. In that manner, the target spot 505 produced by the HEL illumination 504 may be "walked" onto an aimpoint on the target 101.

Figure 6:
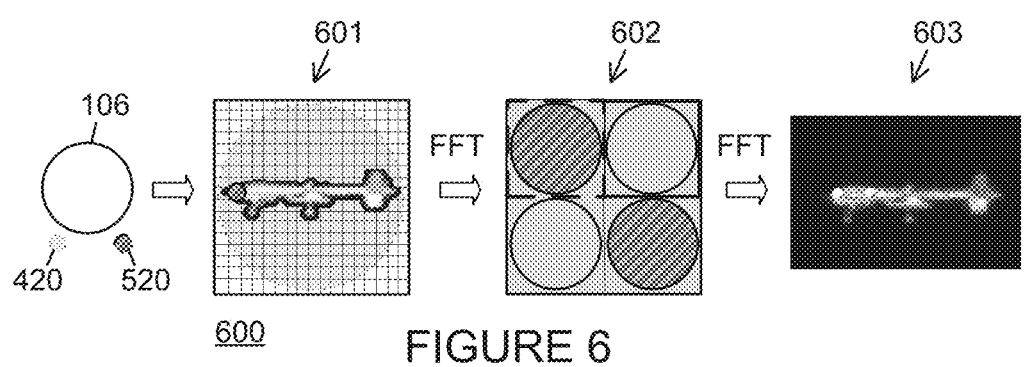
FIG. 6 illustrates image processing performed within the coherent imaging system of FIG. 5.

FIG. 6 illustrates image processing performed within the coherent imaging system of FIG. 5. The processing 600 is analogous to that described in connection with FIG. 2, except that the received return and LO illumination at FPA 109 also includes the LO modulated illumination 520 derived from the Doppler shifted HEL LO illumination source 507. As with the processing 200 of FIG. 2, the processing 600 includes FFT based signal processing of the intensity of light 601 received at the individual pixels of the detector array to produce digital image data 602 and a digital, complex-valued image 603. As illustrated, a different portion of the digital data 602 produced by the initial FFT than is used for the target image may be selected for further processing to produce the laser spot within the digital, complex-valued image 603. Because the HEL LO illumination 520 from source 507 and the flood illumination LO illumination 420 from light source 411 are spatially, angularly, and spectrally offset, the processing of both images may be carried out simultaneously, with the resultant image composed of the HEL spot image overlaid with the target image. The projected laser beam return and active target flood illumination return simultaneously interfere with the respective local oscillator versions of that illumination at the FPA 109. Highly registered images are therefore overlaid, with the resultant image containing the projected laser beam spot as it appears on the target 101. Moreover, because digital holography offers photon limited performance, digital holographic techniques may be used to directly sense the WFE imparted on the projected laser beam.

In the various embodiments described, modifications can be made to improve performance. For example, to avoid negative effects resulting from beam break-up of either or both of the flood illumination or the HEL illumination, multiple flood illumination beams and/or multiple HEL illumination beams may be employed. While a single Doppler detector is described above as sensing both flood illumination return and HEL illumination return, separate Doppler detectors could be employed instead.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. An apparatus comprising:
    at least one processor configured to:
        generate, based on an output of a Doppler sensor that is based on (i) local oscillator (LO) illumination and (ii) a first portion of return illumination that comprises coherent flood illumination reflected off a remote object, Doppler shift data for a Doppler shift corresponding to a longitudinal velocity of the remote object relative to a coherent imaging system;
        receive, from a focal plane array, light intensity data that is based on (i) a second portion of the return illumination and (ii) Doppler-shifted LO illumination that is based on the Doppler shift data; and
        generate, based on the light intensity data, an image of the remote object;
    wherein the light intensity data is also based on (i) Doppler-shifted high energy laser (HEL) LO illumination and (ii) at least a portion of HEL return illumination that comprises HEL illumination reflected off the remote object; and
    wherein the at least one processor is further configured to control generation of the Doppler-shifted HEL LO illumination using the Doppler shift data.

2. The apparatus of claim 1, wherein the at least one processor is further configured to determine a range to the remote object based on the output of the Doppler sensor.

3. An apparatus comprising:
    at least one processor configured to:
        generate, based on an output of a Doppler sensor that is based on (i) local oscillator (LO) illumination and (ii) a first portion of return illumination that comprises coherent flood illumination reflected off a remote object, Doppler shift data for a Doppler shift corresponding to a longitudinal velocity of the remote object relative to a coherent imaging system;
        receive, from a focal plane array, light intensity data that is based on (i) a second portion of the return illumination and (ii) Doppler-shifted LO illumination that is based on the Doppler shift data;
        generate, based on the light intensity data, an image of the remote object;
        employ at least one of the output of the Doppler sensor or the light intensity data from the focal plane array to determine a wavefront error; and
        control a deformable mirror to modify high energy laser (HEL) illumination that is directed at the remote object in order to at least partially compensate for the wavefront error.

4. The apparatus of claim 3, wherein:
the light intensity data is also based on (i) Doppler-shifted HEL LO illumination and (ii) at least a portion of HEL return illumination that comprises the HEL illumination reflected off the remote object; and
the at least one processor is further configured to control generation of the Doppler-shifted HEL LO illumination using the Doppler shift data.

5. The apparatus of claim 3, wherein the at least one processor is configured to control the deformable mirror in order to adjust a hitspot of the HEL illumination on the remote object.

6. The apparatus of claim 3, wherein, to control the deformable mirror, the at least one processor is configured to apply an inverse of the wavefront error to the deformable mirror in order to pre-distort the HEL illumination.

7. An apparatus comprising:
at least one processor configured to:
generate, based on an output of a Doppler sensor that is based on (i) local oscillator (LO) illumination and (ii) a first portion of return illumination that comprises coherent flood illumination reflected off a remote object, Doppler shift data for a Doppler shift corresponding to a longitudinal velocity of the remote object relative to a coherent imaging system;
receive, from a focal plane array, light intensity data that is based on (i) a second portion of the return illumination and (ii) Doppler-shifted LO illumination that is based on the Doppler shift data; and
generate, based on the light intensity data, an image of the remote object;
wherein the light intensity data is also based on (i) Doppler-shifted high energy laser (HEL) LO illumination and (ii) at least a portion of HEL return illumination that comprises HEL illumination reflected off the remote object; and
wherein the at least one processor is further configured to control generation of the LO illumination and HEL LO illumination that is used to produce the Doppler-shifted HEL LO illumination such that the HEL LO illumination is spatially, angularly, and spectrally offset from the LO illumination.

8. An apparatus comprising:
at least one processor configured to:
generate, based on an output of a Doppler sensor that is based on (i) local oscillator (LO) illumination and (ii) a first portion of return illumination that comprises coherent flood illumination reflected off a remote object, Doppler shift data for a Doppler shift corresponding to a longitudinal velocity of the remote object relative to a coherent imaging system;
receive, from a focal plane array, light intensity data that is based on (i) a second portion of the return illumination and (ii) Doppler-shifted LO illumination that is based on the Doppler shift data;
generate, based on the light intensity data, an image of the remote object; and
control an orientation of a mirror in order to change a direction of high energy laser (HEL) illumination that is directed at the remote object onto an aimpoint on the remote object.

9. An apparatus comprising:
at least one processor configured to:
generate, based on an output of a Doppler sensor that is based on (i) local oscillator (LO) illumination and (ii) a first portion of return illumination that comprises coherent flood illumination reflected off a remote object, Doppler shift data for a Doppler shift corresponding to a longitudinal velocity of the remote object relative to a coherent imaging system;
receive, from a focal plane array, light intensity data that is based on (i) a second portion of the return illumination and (ii) Doppler-shifted LO illumination that is based on the Doppler shift data;
generate, based on the light intensity data, an image of the remote object; and
employ digital holographic imaging to simultaneously image both the remote object and high energy laser (HEL) illumination projected onto the remote object.

10. An apparatus comprising:
at least one processor configured to:
generate, based on an output of a Doppler sensor that is based on (i) local oscillator (LO) illumination and (ii) a first portion of return illumination that comprises coherent flood illumination reflected off a remote object, Doppler shift data for a Doppler shift corresponding to a longitudinal velocity of the remote object relative to a coherent imaging system;
receive, from a focal plane array, light intensity data that is based on (i) a second portion of the return illumination and (ii) Doppler-shifted LO illumination that is based on the Doppler shift data; and
generate, based on the light intensity data, an image of the remote object;
wherein, to generate the image of the remote object, the at least one processor is configured to:
perform fast Fourier transform (FFT)-based signal processing of the light intensity data to produce digital image data and a digital complex-valued image;
perform FFT-based signal processing of the digital image data and the digital complex-valued image to generate a high energy laser (HEL) spot image and a target image; and
overlay the HEL spot image with the target image.

11. A method comprising:
generating, based on an output of a Doppler sensor that is based on (i) local oscillator (LO) illumination and (ii) a first portion of return illumination that comprises coherent flood illumination reflected off a remote object, Doppler shift data for a Doppler shift corresponding to a longitudinal velocity of the remote object relative to a coherent imaging system;
receiving, from a focal plane array, light intensity data that is based on (i) a second portion of the return illumination and (ii) Doppler-shifted LO illumination that is based on the Doppler shift data; and
generating, based on the light intensity data, an image of the remote object;
wherein the light intensity data is also based on (i) Doppler-shifted high energy laser (HEL) LO illumination and (ii) at least a portion of HEL return illumination that comprises HEL illumination reflected off the remote object; and
wherein the method further comprises controlling generation of the Doppler-shifted HEL LO illumination using the Doppler shift data.

12. The method of claim 11, further comprising:
determining a range to the remote object based on the output of the Doppler sensor.

13. The method of claim 11, wherein the image comprises a complex-valued two-dimensional (2D) image of the remote object.

14. The method of claim 11, further comprising:
employing at least one of the output of the Doppler sensor or the light intensity data from the focal plane array to determine a wavefront error; and
controlling a deformable mirror to modify the HEL illumination that is directed at the remote object in order to at least partially compensate for the wavefront error.

15. The method of claim 14, wherein the deformable mirror is controlled in order to adjust a hitspot of the HEL illumination on the remote object.

16. The method of claim 14, wherein controlling the deformable mirror comprises applying an inverse of the wavefront error to the deformable mirror in order to pre-distort the HEL illumination.

17. The method of claim 11, further comprising:
controlling generation of the LO illumination and HEL LO illumination that is used to produce the Doppler-shifted HEL LO illumination such that the HEL LO illumination is spatially, angularly, and spectrally offset from the LO illumination.

18. The method of claim 11, further comprising:
controlling an orientation of a mirror in order to change a direction of the HEL illumination that is directed at the remote object onto an aimpoint on the remote object.

19. The method of claim 11, further comprising:
employing digital holographic imaging to simultaneously image both the remote object and the HEL illumination projected onto the remote object.

20. The method of claim 11, wherein generating the image of the remote object comprises:
performing fast Fourier transform (FFT)-based signal processing of the light intensity data to produce digital image data and a digital complex-valued image;
performing FFT-based signal processing of the digital image data and the digital complex-valued image to generate an HEL spot image and a target image; and
overlaying the HEL spot image with the target image.

* * * * *